US010529367B2

(12) United States Patent
Tachibana et al.

(10) Patent No.: US 10,529,367 B2
(45) Date of Patent: Jan. 7, 2020

(54) MAGNETIC RECORDING MEDIUM

(71) Applicant: Sony Corporation, Tokyo (JP)

(72) Inventors: Junichi Tachibana, Miyagi (JP); Tetsuo Endo, Miyagi (JP); Tomoe Ozaki, Miyagi (JP); Hikaru Terui, Miyagi (JP)

(73) Assignee: Sony Corporation, Tokyo (JP)

( * ) Notice: Subject to any disclaimer, the term of this patent is extended or adjusted under 35 U.S.C. 154(b) by 365 days.

(21) Appl. No.: 15/521,775

(22) PCT Filed: Nov. 16, 2015

(86) PCT No.: PCT/JP2015/005688
§ 371 (c)(1),
(2) Date: Apr. 25, 2017

(87) PCT Pub. No.: WO2016/079971
PCT Pub. Date: May 26, 2016

(65) Prior Publication Data
US 2017/0249966 A1 Aug. 31, 2017

(30) Foreign Application Priority Data
Nov. 18, 2014 (JP) ................................. 2014-234034

(51) Int. Cl.
G11B 5/66 (2006.01)
G11B 5/78 (2006.01)
G11B 5/65 (2006.01)
G11B 5/667 (2006.01)
(Continued)

(52) U.S. Cl.
CPC .................. *G11B 5/78* (2013.01); *G11B 5/65* (2013.01); *G11B 5/667* (2013.01); *G11B 5/725* (2013.01); *G11B 5/7315* (2013.01); *G11B 5/7325* (2013.01)

(58) Field of Classification Search
CPC .................................. G11B 5/78; G11B 5/667
See application file for complete search history.

(56) References Cited

U.S. PATENT DOCUMENTS 6,794,058 B2 * 9/2004 Honda ..................... C08K 3/22
257/789
2012/0307395 A1 12/2012 Tonooka et al.
(Continued)

FOREIGN PATENT DOCUMENTS

JP 2002-279615 A 9/2002
JP 2004-118977 A 4/2004
JP 2005-196885 A 7/2005
(Continued)

OTHER PUBLICATIONS

English machine translation, JP 2004118977, Apr. 2004, pp. 1-15 (Year: 2004).*

(Continued)

*Primary Examiner* — Holly C Rickman
(74) *Attorney, Agent, or Firm* — K&L Gates LLP

(57) ABSTRACT

A magnetic recording medium includes a long-shaped base substrate having flexibility, a soft magnetic layer, and a magnetic recording layer. A squareness ratio in a longitudinal direction of the base substrate is equal to or less than a squareness ratio in a short-side direction of the base substrate. The squareness ratio in the longitudinal direction of the base substrate is 30% or less.

20 Claims, 7 Drawing Sheets

(51) Int. Cl.
*G11B 5/725* (2006.01)
*G11B 5/73* (2006.01)

(56) References Cited

U.S. PATENT DOCUMENTS

2014/0106065 A1    4/2014   Maeda et al.
2014/0268414 A1*   9/2014   Nakashio ................ G11B 5/78
                                                          360/110

FOREIGN PATENT DOCUMENTS

| JP | 2006-202373 A | 8/2006 |
| JP | 2009-223970 A | 10/2009 |
| JP | 20M12-252774 A | 12/2012 |
| JP | 2014-081973 A | 5/2014 |

OTHER PUBLICATIONS

English machine translation, JP2005196885, Jul. 2005, pp. 1-14 (Year: 2005).*
English machine translation, JP2006202373, Aug. 2006, pp. 1-54 (Year: 2006).*
International Search Report (with English translation) dated Jan. 26, 2016 in corresponding international application No. PCT/JP2015/005688 (5 pages).
Written Opinion dated Jan. 26, 2016 in corresponding international application No. PCT/JP2015/005688 (6 pages).

* cited by examiner

FIG. 1
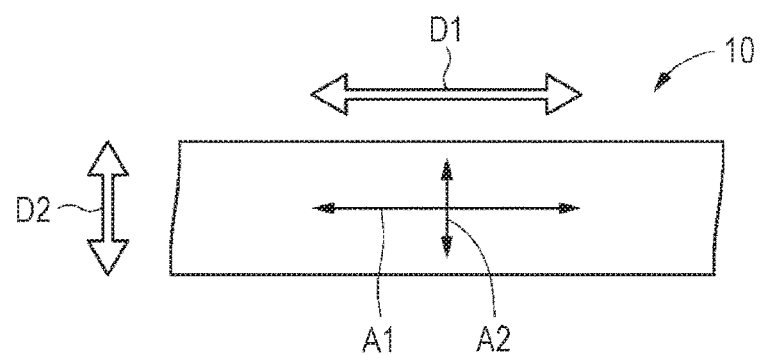
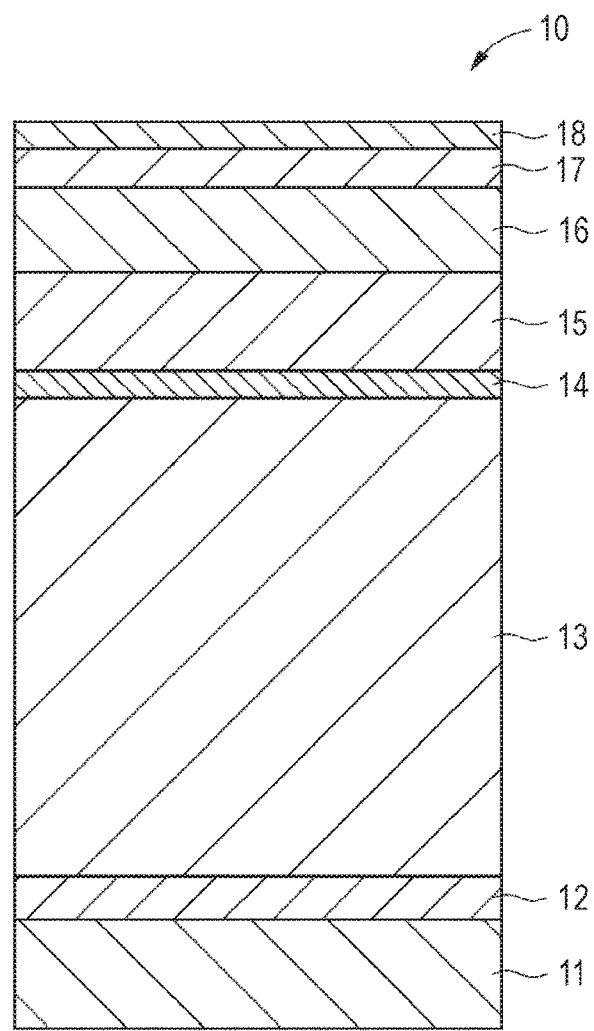

FIG. 7
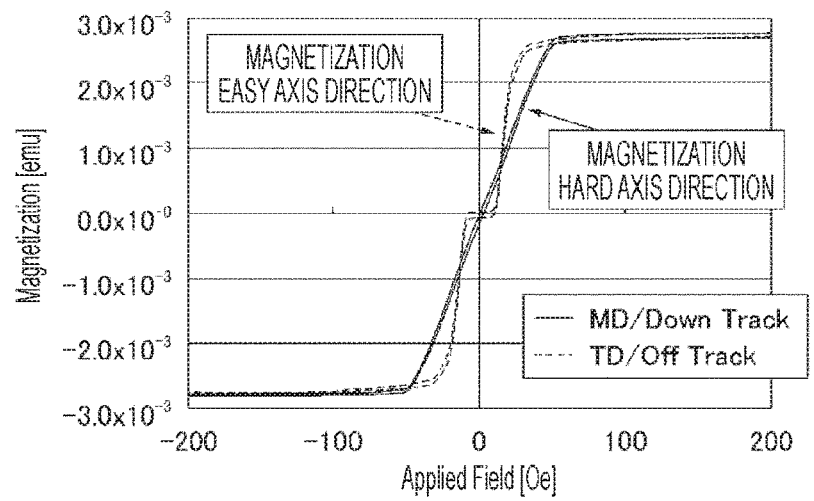
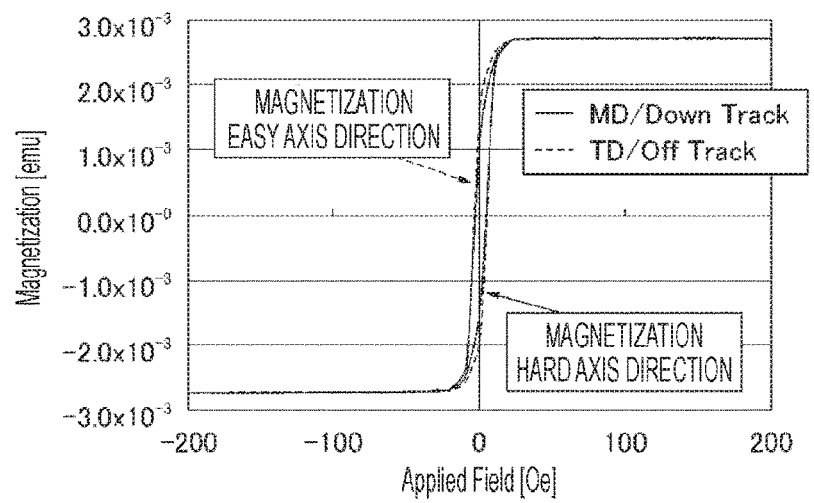
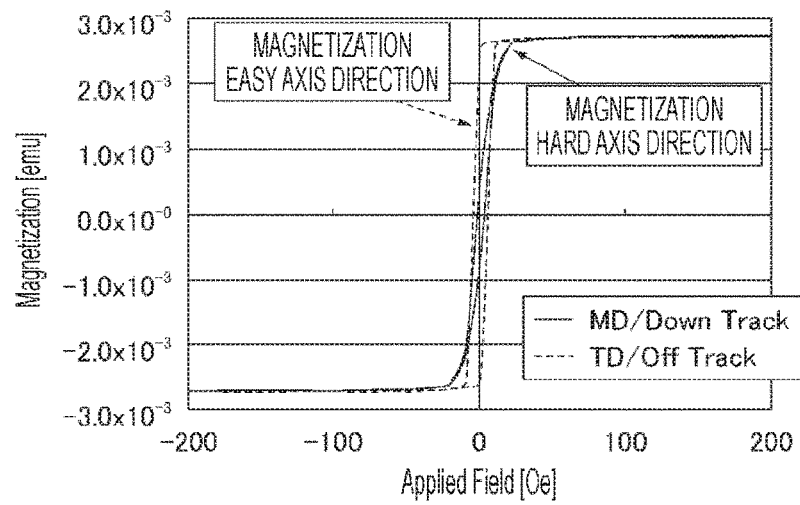

MAGNETIC RECORDING MEDIUM

CROSS-REFERENCE TO RELATED APPLICATIONS

The present application claims the benefit of International Application No. PCT/JP2015/005688, filed Nov. 16, 2015, which claims priority to Japanese Application No. 2014-234034, filed Nov. 18, 2014, the disclosures of which are incorporated herein by reference.

BACKGROUND

The present technology relates to a magnetic recording medium. Specifically, the present technology relates to a magnetic recording medium including a soft magnetic underlayer.

In recent years, a demand for capacity enlargement in a tape medium for data storage is growing due to development of the information technology (IT) society, computerization in libraries, archives, etc. and long-term storage of business documents. To meet such a demand, proposed is a perpendicular magnetic recording medium in which a CoCrPt-based metallic material having a high magnetic anisotropy is subjected to crystal orientation in a perpendicular direction relative to a surface of a non-magnetic base.

For example, Patent Document 1 discloses a magnetic recording medium as a perpendicular magnetic recording medium, in which at least an amorphous layer, a seed layer, a foundation layer, magnetic layer, a magnetic layer, and a protection layer are sequentially formed on a non-magnetic base. Additionally, Patent Document 2 discloses a perpendicular magnetic recording medium including a soft magnetic underlayer.

CITATION LIST

Patent Document
Patent Document 1: Japanese Patent Application Laid-Open No. 2005-196885
Patent Document 2: Japanese Patent Application Laid-Open No. 2002-279615

SUMMARY

Problems to be Solved by the Invention

The present technology is directed to providing a magnetic recording medium having excellent recording and reproducing characteristics.

Solutions to Problems

To solve the above-described problem, the present technology provides a magnetic recording medium including a long-shaped base substrate having flexibility, a soft magnetic layer, and a magnetic recording layer, wherein a squareness ratio in a longitudinal direction of the base substrate is 30% or less.

Effects of the Invention

As described above, according to the present technology, the magnetic recording medium having the excellent recording and reproducing characteristics can be provided.

BRIEF DESCRIPTION OF DRAWINGS

FIG. 1A is a plan view illustrating an exemplary shape of a magnetic recording medium according to a first embodiment of the present technology. FIG. 1B is a cross-sectional view illustrating an exemplary configuration of the magnetic recording medium according to the first embodiment of the present technology.

FIG. 7A is a diagram illustrating a hysteresis loop of a magnetic tape in Examples 3 to 6. FIG. 7B is a diagram illustrating a hysteresis loop of a magnetic tape in Comparative Examples 1 to 3. FIG. 7C is a diagram illustrating a hysteresis loop of a magnetic tape in Examples 1, 2, 7, 8 and Comparative Example 4.

DETAILED DESCRIPTION

Figure 2:
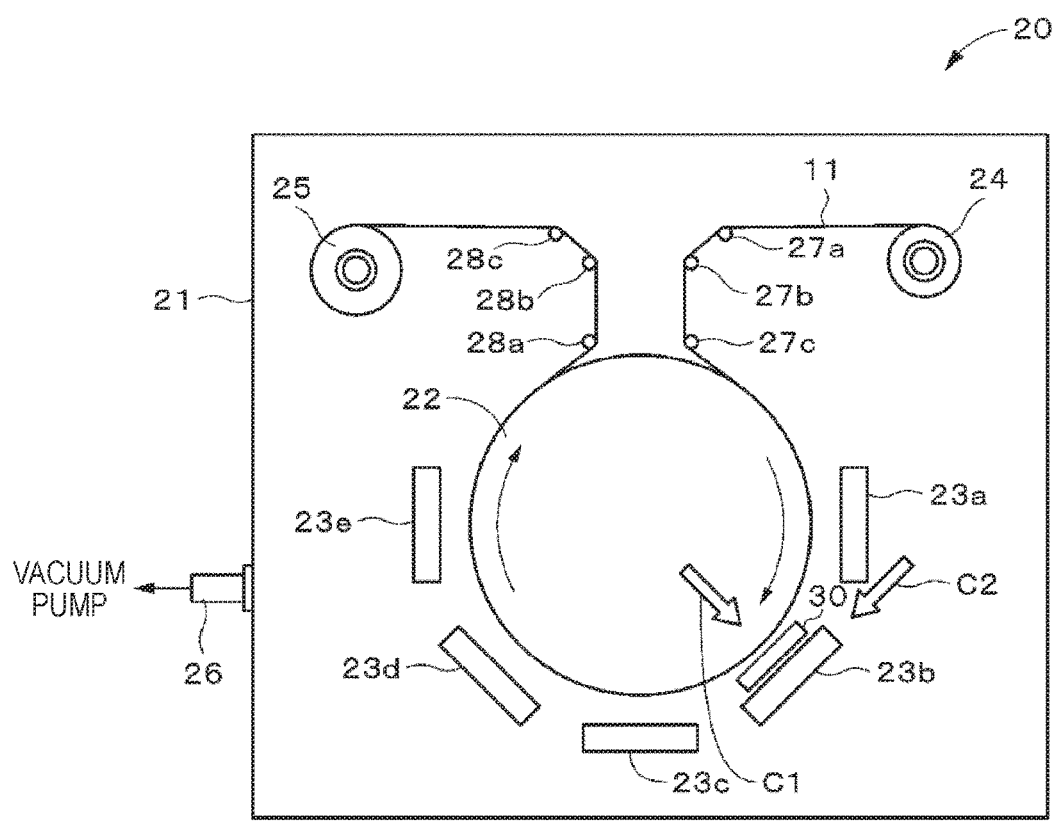
FIG. 2 is a schematic diagram illustrating a configuration of a sputtering device.

In the present technology, a squareness ratio in a longitudinal direction of a base substrate is equal to or less than a squareness ratio in a short-side direction of the base substrate. Here, the squareness ratio is a squareness ratio measured in a state of a magnetic recording medium.

In the case where a soft magnetic layer is a single-layer structure, it is preferable that the squareness ratio in the longitudinal direction of the base substrate be less than the squareness ratio in the short-side direction of the base substrate. In this case, the squareness ratio in the longitudinal direction of the base substrate is 30% or less, preferably 20% or less, more preferably 10% or less, and furthermore preferably 5% or less.

In the case where the soft magnetic layer has a multiple-layer structure including a first soft magnetic layer, an intermediate layer, and a second soft magnetic layer, it is preferable that the squareness ratio in the longitudinal direction of the base substrate be equal to or less than the squareness ratio in the short-side direction of the base substrate. In this case, the squareness ratio in the longitudinal direction of the base substrate is 30% or less, preferably 20% or less, more preferably 10% or less, and furthermore preferably 5% or less. Incidentally, in the case where the soft magnetic layer has the above-described multiple-layer structure, the squareness ratio in the longitudinal direction of the base substrate tends to be equal to or substantially equal to the squareness ratio in the short-side direction of the base substrate with high possibility.

Embodiments of the present technology will be described in the following order.
1 First Embodiment
1.1 Outline
1.2 Configuration of Magnetic Recording Medium
1.3 Configuration of Sputtering Device
1.4 Manufacturing Method of Magnetic Recording Medium
1.5 Effects
1.6 Modified Example 2 Second Embodiment
2.1 Configuration of Magnetic Recording Medium
2.2 Effects
2.3 Modified example
3 Third Embodiment
3.1 Outline
3.2 Configuration of Magnetic Recording Medium
3.3 Effects
3.4 Modified Example

1.1 Outline (Magnetic Anisotropy Direction of Soft Magnetic Underlayer)

Materials such as CoZrNb and FeTaN used as a soft magnetic underlayer (hereinafter referred to as "SUL") develop a magnetic anisotropy depending on film forming conditions. In the case of using these materials as a SUL in a perpendicular magnetic recording medium, a magnetization hard axis direction of the SUL is desirably a moving direction of a recording/reproducing head, namely, a machine direction (MD) because of two reasons described below.

The first reason is to improve reproduction output. The higher initial magnetic permeability is, the higher reproduction output is in a perpendicular magnetic recording medium including a SUL. Additionally, the initial magnetic permeability is higher in the magnetization hard axis direction compared to that in a magnetization facilitating axis direction. Therefore, setting the hard axis direction in the machine direction (MD) is advantageous from the viewpoint of improving the reproduction output.

The second reason is to suppress noise caused by domain wall displacement. A domain wall is formed in the SUL, and when the domain wall is displaced during processes of recording and reproducing, this may cause noise. Therefore, suppressing domain wall displacement is one of important factors in medium design. Since the domain wall is likely to move in the magnetization facilitating axis direction and hardly moves in the magnetization hard axis direction, it is advantageous to set the magnetization hard axis direction of SUL in the machine direction (MD).

(Squareness Ratio in In-Plane Direction)

An M-H loop of a soft magnetic film is significantly varied by whether the magnetic anisotropy is a magnetization facilitating axis direction or a magnetization hard axis direction. In the magnetization facilitating axis direction, hysteresis characteristics are clearly exhibited, and coercive force Hc is strong and the squareness ratio becomes large compared to those in the magnetization hard axis direction. On the other hand, in the magnetization hard axis direction, the coercive force Hc is weak and a squareness ratio becomes extremely small because a magnetization value is nearly zero even in a region where magnetic field application is nearly zero. Due to such characteristics, a magnetic anisotropy direction can be easily determined by a magnetic characteristic in an in-plane direction.

There is not only a SUL but also a recording layer in a perpendicular magnetic recording medium including the SUL, and in the case of measuring an average magnetic characteristic in a medium by using a vibrating sample magnetometer (VSM) or the like, a sum of magnetic characteristics of the SUL and recording layer is measured. However, considering materials, film thicknesses, and measurement directions used in the respective layers, a value of the magnetic characteristic of the recording layer is small compared to a value of magnetic characteristic of a soft magnetic layer underlayer and the magnetic characteristic of the SUL is mostly reflected on a measured value by the VSM in a region assumed for actual use as a magnetic recording medium.

Meanwhile, recently in a hard disk drive (HDD) for which a perpendicular magnetic recording medium including an SUL is mainly used, magnetic characteristic evaluation on a recording layer by using the polar Kerr effect is mainly conducted to evaluate magnetic characteristics, and magnetic characteristic evaluation as a total film including the SUL is not conducted.

Considering the above-described viewpoint, in the first embodiment, the magnetization hard axis direction of the SUL is aligned with the machine direction (MD) and furthermore the squareness ratio in the machine direction (MD) is set to a predetermined value or less in order to improve reproduction output and suppress noise caused by domain wall displacement of the SUL in a perpendicular magnetic recording medium including a single-layer SUL. In other words, a squareness ratio Sq1 in the machine direction (MD) of the perpendicular magnetic recording medium is set smaller than a squareness ratio Sq2 in a transverse direction (TD) orthogonal thereto (Sq1<Sq2), and also the squareness ratio in the machine direction (MD) is set to the predetermined value or less.

1.2 Configuration of Magnetic Recording Medium

In the following, an exemplary configuration of the magnetic recording medium 10 according to the first embodiment of the present technology will be described with reference to FIGS. 1A and 1B. The magnetic recording medium 10 has a long shape as illustrated in FIG. 1A In the following, a longitudinal direction of the magnetic recording medium 10 will be referred to as a machine direction (MD) D1 and a short-side direction will be referred to as a transverse direction (TD) D2. Here, the machine direction D1 is a relative moving method of a recording/reproducing head relative to the magnetic recording medium 10, namely, a direction in which the magnetic recording medium 10 is made to travel during recording/reproducing. The magnetic recording medium 10 includes a magnetization hard axis A1 parallel to the machine direction D1 and a magnetization easy axis A2 parallel to the transverse direction D2.

The magnetic recording medium 10 is a so-called two-layer perpendicular magnetic recording medium, and includes a base substrate 11, a foundation layer 12 provided on a surface of the base substrate 11, a single-layer SUL 13 provided on a surface of the foundation layer 12, a foundation layer 14 provided on a surface of the SUL 13, an intermediate layer 15 provided on a surface of the foundation layer 14, a magnetic recording layer 16 provided on a surface of the intermediate layer 15, and a protection layer 17 provided on a surface of the magnetic recording layer 16 as illustrated in FIG. 1B. The magnetic recording medium 10 may further include a lubrication layer 18 provided on the surface of the protection layer 17.

It is suitable to use the magnetic recording medium 10 as a data archive storage medium expected to have higher demand in future. The magnetic recording medium 10 can achieve a surface recording density which is 10 times or more of an existing coating magnetic tape for storage, that is, a surface recording density of 50 Gb/in$^2$. In the case of forming a data cartridge of a general linear recording system by using the magnetic recording medium 10 having such a mentioned surface recording density, large-capacity recording of 50 TB or more can be achieved per reel of the data cartridge. It is suitable to use this magnetic recording medium 10 as a recording/reproducing device using a single pole type (SPT) recording head and a tunnel magnetoresistive (TMR) type reproducing head.

The squareness ratio Sq1 in the machine direction (MD) D1 of the magnetic recording medium 10 is less than the squareness ratio Sq2 in the transverse direction (TD) of the magnetic recording medium 10 (Sq1<Sq2). Additionally, the squareness ratio in the machine direction (MD) D1 of the magnetic recording medium 10 is 30% or less, preferably 20% or less, more preferably 10% or less, and furthermore preferably 5% or less. Consequently, excellent recording and reproducing characteristics can be achieved. Here, the squareness ratio is a squareness ratio measured in the state of the magnetic recording medium 10, and also measured by, specifically, using the VSM while applying a magnetic field of 10 kOe or more.

(Base Substrate)

The base substrate 11 to be a base is, for example, a long-shaped film. The film has a thickness of, for example, 3 μm or more and 8 μm or less. As the base substrate 11, it is preferable that a non-magnetic base substrate having flexibility be used. For example, a flexible polymer resin material used for a general magnetic recording medium can be used as a material of the non-magnetic base substrate. Examples of the polymer material may include polyesters, polyolefins, a cellulose derivative, a vinyl-based resin, polyimides, polyamides, polycarbonates, or the like.

(Foundation Layer)

The foundation layer 12 is provided between the base substrate 11 and the SUL 13. The foundation layer 14 is provided between the SUL 13 and the intermediate layer 15. The foundation layers 12 and 14 include an alloy including Ti and Cr and have an amorphous state. Additionally, the alloy may further include oxygen (O). The oxygen is, for example, impurity oxygen slightly included inside the foundation layers 12, 14 at the time of forming films of the foundation layers 12, 14 by a film forming method such as a sputtering method. The foundation layer 14 has a crystal structure similar to the intermediate layer 15 and is not intended for crystal growth but intended to improve perpendicular orientation of the intermediate layer 15 by flatness and the amorphous state of the foundation layer 14. Here, the term "alloy" means at least one kind of solid solution, eutectic body, an intermetallic compound, and the like including Ti and Cr. Additionally, the term "amorphous state" means a state that a hollow is observed by an electron diffraction method and a crystal structure cannot be identified.

The foundation layer 12 including the alloy that includes Ti and Cr and having the amorphous state is provided with functions to: suppress influence of an $O_2$ gas and $H_2O$ adsorbed to the base substrate 11; and also reduce unevenness of the surface of the base substrate 11 to form a metallic smooth surface on the base substrate 11. Such functions can improve perpendicular orientation of the intermediate layer 15. Meanwhile, when the foundation layers 12, 14 are made to a crystal state, a columnar shape accompanied by crystal growth becomes distinct, and unevenness on the surface of the base substrate 11 and the SUL 13 is emphasized, and consequently crystal orientation of the intermediate layer 15 is deteriorated.

The alloy included in the foundation layers 12, 14 may further include another element other than Ti and Cr as an additive element. Examples of such an additive element may include one or more kinds of elements selected from a group formed of, for example, Nb, Ni, Mo, Al, W, and the like.

(SUL)

The SUL 13 is the single-layer SUL and provided between the foundation layer 12 and the foundation layer 14. The SUL 13 has a film thickness of, preferably 40 nm or more, and more preferably, 40 nm or more and 140 nm or less. The SUL 13 includes a soft magnetic material in an amorphous state. As the soft magnetic material, a Co-based material, a Fe-based material, or the like can be used, for example. Examples of the Co-based material may include CoZrNb, CoZrTa, CoZrTaNb, and the like. Examples of the Fe-based material may include FeCoB, FeCoZr, FeCoTa, and the like.

Since the SUL 13 has the amorphous state, the SUL 13 does not assume a role to urge epitaxial growth of a layer formed on the SUL 13, but is required not to disturb crystal orientation of the intermediate layer 15 formed on the SUL 13. Therefore, a fine structure that prevents the soft magnetic material from forming a column is required, however; in the case where there is large degassing influence of water and the like from the base substrate 11, the soft magnetic material may be coarsened and crystal orientation of the intermediate layer 15 formed on the SUL 13 may be disturbed. To suppress such influence, it is preferable that the foundation layer 12 be formed on the surface of the base substrate 11. In the case of using, as the base substrate 11, a polymer material film to which water and a gas such as oxygen are frequently adsorbed, it is especially preferable that the foundation layer 12 be provided in order to suppress influence therefrom.

The SUL 13 has the magnetization hard axis A1 in the machine direction (MD) D1 and the magnetization easy axis A2 in the transverse direction (TD) D2. Consequently, excellent recording and reproducing characteristics can be achieved. Presence of the magnetization hard axis A1 and magnetization easy axis A2 in the above-described directions can be confirmed by acquiring squareness ratios in the machine direction (MD) D1 and transverse direction (TD) D2 of the magnetic recording medium 10 as described above.

(Intermediate Layer)

The intermediate layer 15 is provided between the foundation layer 14 and the magnetic recording layer 16. Preferably, the intermediate layer 15 has a crystal structure similar to that of the magnetic recording layer 16. In the case where the magnetic recording layer 16 includes a Co-based alloy, it is preferable that the intermediate layer 15 include a material having a hexagonal close-packed (hcp) structure similar to that of the Co-based alloy and a c-axis of a structure thereof be oriented in a perpendicular direction (i.e., film thickness direction) relative to a film surface. The reason is that orientation of the magnetic recording layer 16 can be improved and also a lattice constant of the intermediate layer 15 can be matched relatively well to that of the magnetic recording layer 16. Preferably, a material including Ru is used as a material having the hexagonal close-packed (hcp) structure, and specifically, a Ru single body or a Ru alloy is preferable. An example of the Ru alloy may be a Ru alloy oxide such as Ru—$SiO_2$, Ru—$TiO_2$, Ru—$ZrO_2$, or the like.

(Magnetic Recording Layer)

The magnetic recording layer 16 is provided between the intermediate layer 15 and the protection layer 17. The magnetic recording layer 16 is a so-called perpendicular magnetic recording layer, and preferably is a granular magnetic layer including a Co-based alloy in terms of improving a recording density. Such a granular magnetic layer is formed of a ferromagnetic crystal grain including a Co-based alloy and a non-magnetic grain boundary (non-magnetic body) surrounding the ferromagnetic crystal grain. More specifically, the granular magnetic layer is formed of: a column (columnar crystal) including a Co-based alloy; and a non-magnetic grain boundary (e.g., oxide such as $SiO_2$) adapted to surround the column and magnetically separate one column from the other. In this structure, the magnetic recording layer 16 having a structure in which respective columns are magnetically separated from one another can be formed.

The Co-based alloy has the hexagonal close-packed (hcp) structure, and the c-axis thereof is oriented in the perpendicular direction (film thickness direction) relative to the film surface. As the Co-based alloy, preferably, a CoCrPt-based alloy including at least Co, Cr, and Pt is used. The CoCrPt-based alloy is not particularly limited, and the CoCrPt alloy may further include an additive element. Examples of the additive element may include one or more kinds of elements selected from a group of, for example, Ni, Ta, and the like.

The non-magnetic grain boundary surrounding the ferromagnetic crystal grain includes a non-magnetic metallic material. Note that a metal includes a semimetal here. As the non-magnetic metallic material, for example, at least one of a metal oxide and a metal nitride can be used, and using the metal oxide is preferable in terms of more stably keeping the granular structure. Examples of the metal oxide may include a metal oxide including at least one or more kinds of elements selected from a group formed of Si, Cr, Co, Al, Ti, Ta, Zr, Ce, Y, Hf, and the like, and the metal oxide including at least a Si oxide (i.e., $SiO_2$) is preferable. An example thereof may be $SiO_2$, $Cr_2O_3$, CoO, $Al_2O_3$, $TiO_2$, $Ta_2O_5$, $ZrO_2$, $HfO_2$, or the like. An example of the metal nitride may be a metal nitride including at least one or more kinds elements selected from a group of formed of Si, Cr, Co, Al, Ti, Ta, Zr, Ce, Y, Hf, and the like. An example thereof may be SiN, TiN, AlN, or the like. In order to more stably keep the granular structure, the non-magnetic grain boundary preferably includes the metal oxide out of the metal nitride and the metal oxide.

Preferably, the CoCrPt-based alloy included in the ferromagnetic crystal grain and a Si oxide included in the non-magnetic grain boundary have an average composition specified in Formula (1) below. The reason is that influence from a demagnetizing field can be suppressed and saturation magnetization Ms capable of securing sufficient reproduction output can be achieved, thereby achieving further improvement of recording and reproducing characteristics.

$(Co_xPt_yCr_{100-x-y})_{100-z}$—$(SiO_2)_z$ (1)

(In Formula (1), note that x, y, z are values within following respective ranges: 69≤X≤72, 12≤y≤16, and 9≤Z≤12.)

Meanwhile, the above composition can be acquired as follows. Etching by ion beams is performed from the protection layer 17 side of the magnetic recording medium 10, analysis based on the Auger electron spectroscopy is conducted for an outermost surface of the etched magnetic recording layer 16, and an average atomic number ratio relative to a film thickness is deemed as a ratio of the element. Specifically, analysis is conducted for five elements of Co, Pt, Cr, Si, and O, and element content is identified by a percentage ratio.

(Protection Layer)

The protection layer 17 includes, for example, a carbon material or a silicon dioxide ($SiO_2$) and preferably includes the carbon material in terms of film strength of the protection layer 17. An example of the carbon material may be graphite, diamond-like carbon (DLC), diamond, or the like.

(Lubrication Layer)

The lubrication layer 18 includes at least one kind of lubricant. The lubrication layer 18 may further include various kinds of additive agents such as an anticorrosive agent as needed. The lubricant has at least two carboxyl groups and one ester bond, and includes at least one kind of a carboxylic compound represented by General Formula (1) below. The lubricant may further include a kind of lubricant other than the carboxylic compound represented by General Formula (1).

General Formula (1):

[Chemical Formula 1]

(In this formula, Rf is a non-substituted or substituted and also saturated or unsaturated fluorine-containing hydrocarbon group or hydrocarbon group, Es is an ester bond, and R may be omitted but is a non-substituted or substituted and also saturated or unsaturated hydrocarbon group.)

Preferably, the above carboxylic compound is the one represented by General Formula (2) or (3) below.

General Formula (2):

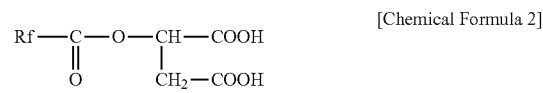

[Chemical Formula 2]

(In this formula, Rf is a non-substituted or substituted and also saturated or unsaturated fluorine-containing hydrocarbon group or hydrocarbon group.)

General Formula (3):

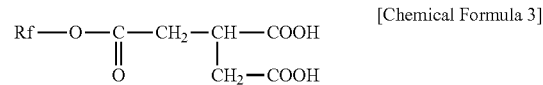

[Chemical Formula 3]

(In this formula, Rf is a non-substituted or substituted and also saturated or unsaturated fluorine-containing hydrocarbon group or hydrocarbon group.)

Preferably, the lubricant includes one or both of the carboxylic compounds represented by the above General Formulas (2) and (3).

When the magnetic recording layer 16, protection layer 17, or the like is coated with the lubricant including the carboxylic compound represented by General Formula (1), a lubricating function is developed by cohesion force between fluorine-containing hydrocarbon groups or hydrocarbon groups Rf which are hydrophobic groups. In the case where the Rf group is a fluorine-containing hydrocarbon group, the total carbon number is 6 to 50, and also the total carbon number of a fluorohydrocarbon group is preferably 4 to 20. The Rf group may be saturated or unsaturated, and linear, branched, or cyclic, but it is especially preferable that the Rf group be saturated and linear.

For example, in the case where the Rf group is a hydrocarbon group, it is desirable that the Rf group be a group represented by General Formula (4) below.

General Formula (4):

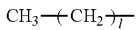
[Chemical Formula 4]

(In General Formula (4), note that l is an integer selected from a range from 8 to 30, more desirably from 12 to 20.)

Furthermore, in the case where the Rf group is a fluorine-containing hydrocarbon group, it is desirable that the Rf group be a group represented by General Formula (5) below.

General Formula (5):

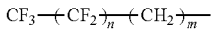
[Chemical Formula 5]

(In General Formula (5), note that m and n are integers selected from respective ranges as next: m=2 to 20 and n=3 to 18, more desirably, m=4 to 13 and n=3 to 10.)

The fluorohydrocarbon group may be concentrated in one place as described above, or may also be dispersed like General Formula (6) below, and furthermore not only —$CF_3$ and —$CF_2$— but also —$CHF_2$, —CHF—, and the like may also be possible.

General Formula (6):

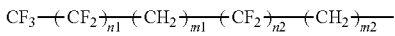
[Chemical Formula 6]

(In General Formula (6), note that n1+n2=n, m1+m2=m are satisfied.)

The reason for limiting the carbon number as described above in General Formulas (4), (5), and (6) is that: when the carbon number constituting an alkyl group or a fluorine-containing alkyl group (1 or a sum of m and n) is the above lower limit or more, a length thereof has an appropriate length and cohesion force between the hydrophobic groups is effectively exerted, an excellent lubrication function is developed, and resistance to friction/abrasion is improved. Also, another reason is that: when the carbon number is the above upper limit or less, solubility of the lubricant formed of the above carboxylic compound in a solvent can be well secured.

Particularly, in the case of containing a fluorine atom, the Rf group brings an effect on decreasing a friction coefficient and also on improving travel performance, and the like. However, it is preferable that stability of the ester bond be secured and hydrolysis be prevented by providing a hydrocarbon group between a fluorine-containing hydrocarbon group and an ester bond and separating the fluorine-containing hydrocarbon group from the ester bond.

Furthermore, the Rf group may include a fluoroalkyl ether group or a perfluoropolyether group.

The R group may also be included, but in the case of including the R group, a hydrocarbon chain having the small carbon number is preferable.

Additionally, the Rf group or the R group includes elements such as nitrogen, oxygen, sulfur, phosphorus, and halogen as constituent elements, and may further include a hydroxyl group, a carboxyl group, a carbonyl group, an amino group, an ester bond, and the like in addition to the above-described functional groups.

Preferably, the carboxylic compound represented by General Formula (1) is specifically at least one kind out of compounds listed below. In other words, preferably, the lubricant includes at least one kind out of the compounds listed below.

The carboxylic compound represented by General Formula (1) is soluble in a fluorine-free solvent having a small load on environment, and provides an advantage in which operation such as coating, immersing, and spraying can be performed by using general purpose solvents such as a hydrocarbon solvent, a ketone solvent, an alcohol solvent, and an ester solvent. Specifically, solvents of hexane, heptane, octane, decane, dodecane, benzene, toluene, xylene, cyclohexane, methyl isobutyl ketone, methanol, ethanol, isopropanol, diethylether, tetrahydrofuran, dioxane, cyclohexanone, and the like may be exemplified.

In the case where the protection layer 17 includes a carbon material, when the protection layer 17 is coated with the above-described carboxylic compound as a lubricant, two carboxyl groups corresponding to polar groups of lubricant molecules and at least one ester bond group are adsorbed onto the protection layer 17, and the lubrication layer 18 being excellent especially in durability can be formed by cohesion force between the hydrophobic groups.

Meanwhile, the lubricant may be not only held as the lubrication layer 18 on the surface of the magnetic recording medium 10 as described above but also included and held in the layers such as the magnetic recording layer 16 and the protection layer 17 constituting the magnetic recording medium 10.

1.3 Configuration of Sputtering Device

In the following, an exemplary configuration of the sputtering device 20 used in manufacturing the above-described magnetic recording medium 10 will be described with reference to FIGS. 2, 3A, 3B, and 4. The sputtering device 20 is a continuous winding type sputtering device used for film formation of the foundation layer 12, SUL 13, foundation layer 14, intermediate layer 15, and magnetic recording layer 16. As illustrated in FIG. 2, the sputtering device 20 includes a film formation chamber 21, a drum 22 that is a metallic can (rotational body), cathodes 23a to 23e, a feeding reel 24, a winding reel 25, and a plurality of guide rolls 27a to 27c and 28a to 28c, and a magnetic field orientation device 30. The sputtering device 20 is, for example, a device of a DC (direct current) magnetron sputtering system, but the sputtering system is not limited this system.

The film formation chamber 21 is connected to a vacuum pump not illustrated via an exhaust port 26, and atmosphere inside the film formation chamber 21 is set to a predetermined vacuum level by this vacuum pump. The rotatable drum 22, feeding reel 24, and winding reel 25 having a rotational configuration are disposed inside the film formation chamber 21. The plurality of guide rolls 27a to 27c adapted to guide conveyance of the base substrate 11 between the feeding reel 24 and the drum 22 is provided, and also the plurality of guide rolls 28a to 28c adapted to guide conveyance of the base substrate 11 between the drum 22 and the winding reel 25 is provided inside the film formation chamber 21. During sputtering, the base substrate 11 unreeled from the feeding reel 24 is reeled by the winding reel 25 via the guide rolls 27a to 27c, drum 22, and guide rolls 28a to 28c. The drum 22 has a cylindrical shape, and the base substrate 11 having a thin and long rectangular shape is conveyed along a cylindrical-shaped peripheral surface of the drum 22. The drum 22 is provided with a cooling mechanism not illustrated, and cooled to, for example, approximately −20° C. during sputtering. The plurality of cathodes 23a to 23e is disposed inside the film formation chamber 21 in a manner facing the peripheral surface of the drum 22. These cathodes 23a to 23e have preset targets respectively. Specifically, the cathodes 23a, 23b, 23c, 23d, 23e respectively have preset targets for form films of the foundation layer 12, SUL 13, foundation layer 14, intermediate layer 15, and magnetic recording layer 16. Multiple kinds of films, namely, the films of the foundation layer 12, SUL 13, foundation layer 14, intermediate layer 15, and magnetic recording layer 16 are simultaneously formed by these cathodes 23a to 23e.

Figure 3:
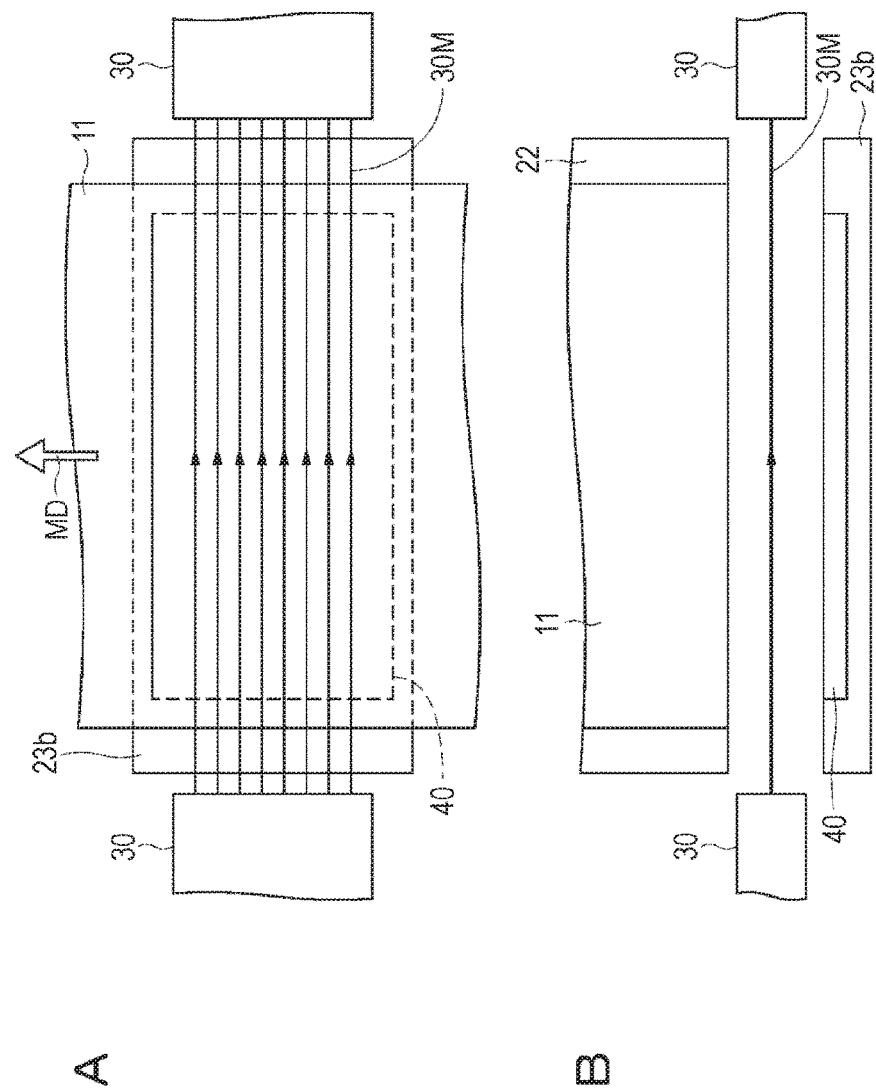
FIG. 3A is an enlarged plan view of a part of the sputtering device illustrated in FIG. 2 when viewed in a direction from an arrow C1.
FIG. 3B is an enlarged side view of the part of the sputtering device illustrated in FIG. 2 when viewed in a direction from an arrow C2.

The magnetic field orientation device 30 is provided in the vicinity of the cathode 23b. As illustrated in FIGS. 3A and 3B, this magnetic field orientation device 30 is adapted to be able to generate a magnetic line 30M in the transverse direction of the drum 22, namely, the transverse direction of the base substrate 11 conveyed along the peripheral surface of the drum 22 in a space between the cylindrical surface of the drum 22 and the cathode 23b. The cathode 23b has a target 40 to form the film of the SUL 13 on a side facing the cylindrical surface of the drum 22.

Figure 4:
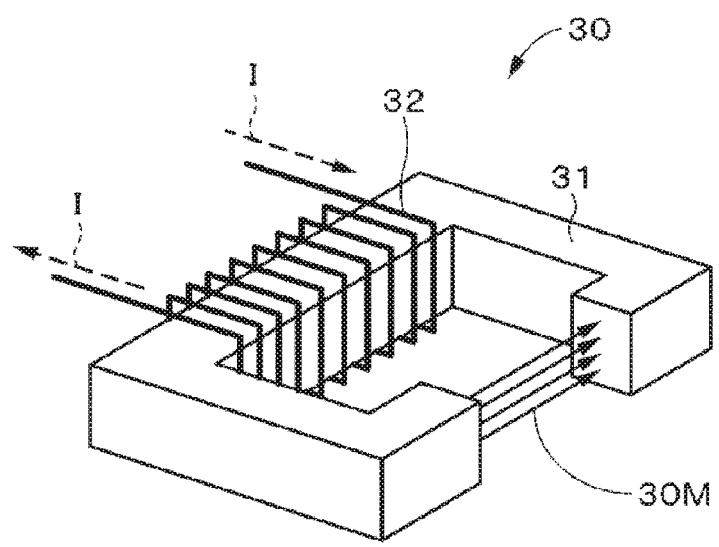
FIG. 4 is a perspective view illustrating an exemplary configuration of a magnetic field orientation device.

The magnetic field orientation device 30 is a so-called electromagnet and includes a yoke core 31 and a coil 32 wound around the yoke core 31 as illustrated in FIG. 4. The yoke core 31 has a substantially C-shape curved in a manner such that both ends thereof face each other. In the magnetic field orientation device having the above-described configuration, the magnetic line 30M is generated between the facing end portions of the yoke cores 31 when current I flows in the coil 32.

1.4 Manufacturing Method of Magnetic Recording Medium

In the following, an exemplary manufacturing method of the magnetic recording medium 10 according to the first embodiment of the present technology will be described. First, the foundation layer 12, SUL 13, foundation layer 14, intermediate layer 15, and magnetic recording layer 16 are sequentially stacked on the surface of the base substrate 11 by using the sputtering device 20 illustrated in FIG. 2. Specifically, the layers are stacked as described below. First, the film formation chamber 21 is vacuumed to a predetermined pressure. After that, while a process gas such as an Ar gas is introduced into the film formation chamber 21, the targets preset for the cathodes 23a to 23e are sputtered, and the films of the foundation layer 12, SUL 13, foundation layer 14, intermediate layer 15, and magnetic recording layer 16 are sequentially formed on the surface of the base substrate 11.

Note that the magnetic line 30M is generated by the magnetic field orientation device 30 in the space between the cylindrical surface of the drum 22 and the cathode 23b in the transverse direction of the drum 22, namely, the transverse direction of the base substrate 11 conveyed along the peripheral surface of the drum 22. Consequently, the film of the SUL 13 having the magnetization hard axis A1 in the machine direction (MD) D1 and having the magnetization easy axis A2 in the transverse direction (TD) D2 is formed.

Next, the protection layer 17 is formed on the surface of the magnetic recording layer 16. As the forming method of the protection layer 17, a chemical vapor deposition (CVD) method or a physical vapor deposition (PVD) method can be used, for example. Next, the lubrication layer 18 is formed by coating the surface of the protection layer 17 with a lubricant as needed. In the above-described manner, the magnetic recording medium 10 illustrated in FIG. 1 can be obtained.

1.5 Effects

In the magnetic recording medium 10 according to the first embodiment, the squareness ratio Sq1 in the machine direction (MD) D1 is set less than the squareness ratio Sq2 in the transverse direction (TD) D2 (Sq1<Sq2). In the magnetic recording medium 10 having such a magnetic characteristic, the magnetization hard axis A1 of the SUL 13 is in the machine direction (MD) D1 and the magnetization easy axis A2 is in the transverse direction (TD) D2. Furthermore, the squareness ratio in the machine direction (MD) D1 is set to 30% or less. Consequently, high reproduction output can be achieved, and also noise caused by domain wall displacement of the SUL 13 can be suppressed. Therefore, excellent recording and reproducing characteristics can be achieved.

1.6 Modified Example

In the above-described first embodiment, the magnetic recording medium 10 including the foundation layer 12 has been described, but there may also be a configuration in which the foundation layer 12 is omitted. Additionally, the magnetic recording medium 10 including both the foundation layer 14 and the intermediate layer 15 has been described above, but there may also be a configuration in which both or one of the foundation layer 14 and the intermediate layer 15 is omitted. In this configuration also, the foundation layer 12 may also be omitted as described above.

2. Second Embodiment

2.1 Configuration of Magnetic Recording Medium

Figure 5:
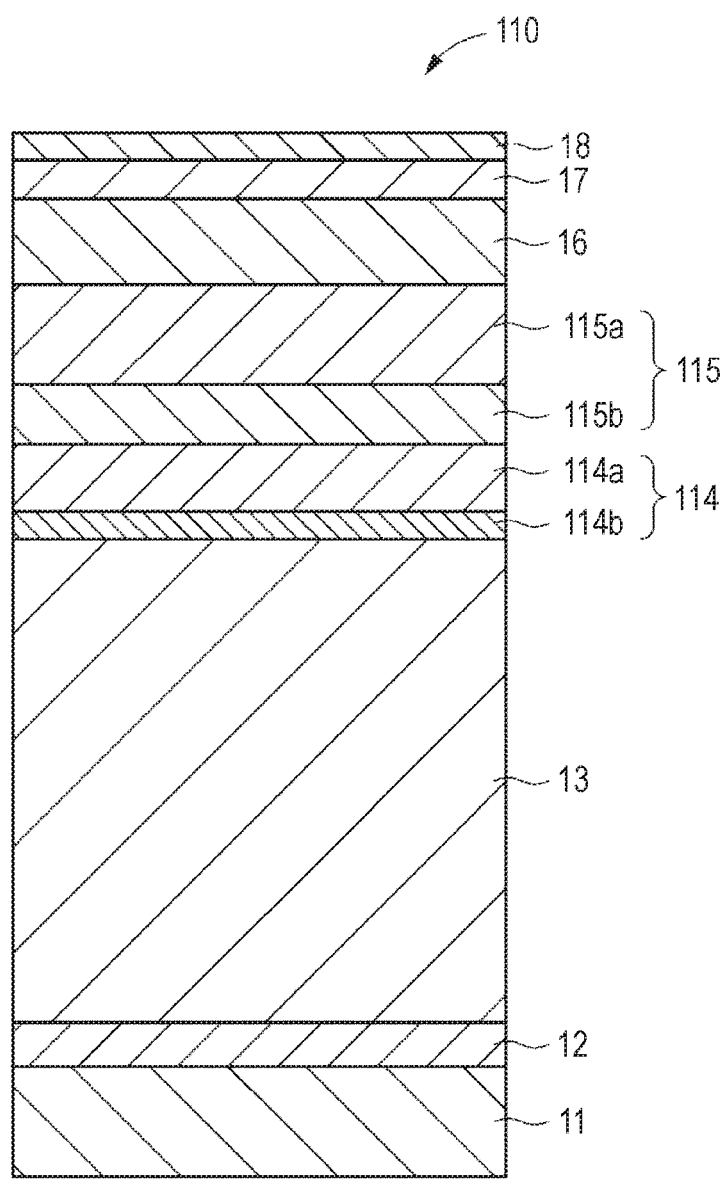
FIG. 5 is a cross-sectional view illustrating an exemplary configuration of a magnetic recording medium according to a second embodiment of the present technology.

As illustrated in FIG. 5, a magnetic recording medium 110 according to a second embodiment of the present technology differs from a magnetic recording medium 10 according to a first embodiment in including a two-layer structure formed of a foundation layer 114 and an intermediate layer 115. Note that a portion similar to a portion of the first embodiment will be denoted by a same reference sign in the second embodiment, and repetition of the same description will be omitted.

The foundation layer 114 includes a first foundation layer (upper foundation layer) 114a and a second foundation layer (lower foundation layer) 114b. The first foundation layer 114a is provided on a side of the intermediate layer 115, and the second foundation layer 114b is provided on a side of the soft magnetic underlayer 13.

As a material of the second foundation layer 114b, a material similar to that of a foundation layer 14 in the first embodiment can be used. As a material of the first foundation layer 114a, a material having composition different from that of the second foundation layer 114b can be used. An example of the material may be NiW, Ta, or the like. Meanwhile, the first foundation layer 114a can be deemed as an intermediate layer instead of the foundation layer.

The intermediate layer 115 includes a first intermediate layer (upper intermediate layer) 115a and a second intermediate layer (lower intermediate layer) 115b. The first intermediate layer 115a is provided on a magnetic recording layer 16 side, and the second intermediate layer 115b is provided on the foundation layer 114.

As a material of the first intermediate layer 115a and the second intermediate layer 115b, for example, a material similar to that of the intermediate layer 15 in the above-described first embodiment can be used. However, intended effects are different in the first intermediate layer 115a and the second intermediate layer 115b respectively, and therefore, respective sputtering conditions are different. In other words, it is important for the first intermediate layer 115a to achieve a film structure that encourages a granular structure of the magnetic recording layer 16 that is to be the upper layer thereof, and it is important for the second intermediate layer 115b to achieve a film structure having high crystal orientation.

2.2 Effects

In the magnetic recording medium 110 according to the second embodiment, since the foundation layer 114 includes the foundation layers 114 having the two-layer structure, orientation of the intermediate layer 115 and the magnetic recording layer 16 is further improved and a magnetic characteristic can be further enhanced. Furthermore, since the intermediate layer 115 includes the intermediate layers 115 having the two-layer structure, orientation and the granular structure of the magnetic recording layer 16 are further improved and the magnetic characteristic can be further enhanced.

2.3 Modified Example

In the second embodiment, the exemplary configuration in which both the foundation layer 114 and intermediate layer 115 have the two-layer structures has been described, but the configurations of the foundation layer and intermediate layer are not limited to this example. For example, one of the foundation layer and the intermediate layer may have a two-layer configuration, and the other one may have a single-layer structure.

3. Third Embodiment

3.1 Outline

In a first embodiment described above, a magnetic recording medium 10 in which a magnetization hard axis A1 of a SUL 13 is set in a machine direction (MD) in order to suppress domain wall displacement has been described. In a third embodiment, a magnetic recording medium in which not only a magnetization hard axis A1 is set in a machine direction (MD) but also an antiparallel coupled SUL (hereinafter referred to as "APC-SUL") is adopted as a SUL in order to further suppress domain wall displacement will be described.

3.2 Configuration of Magnetic Recording Medium

Figure 6:
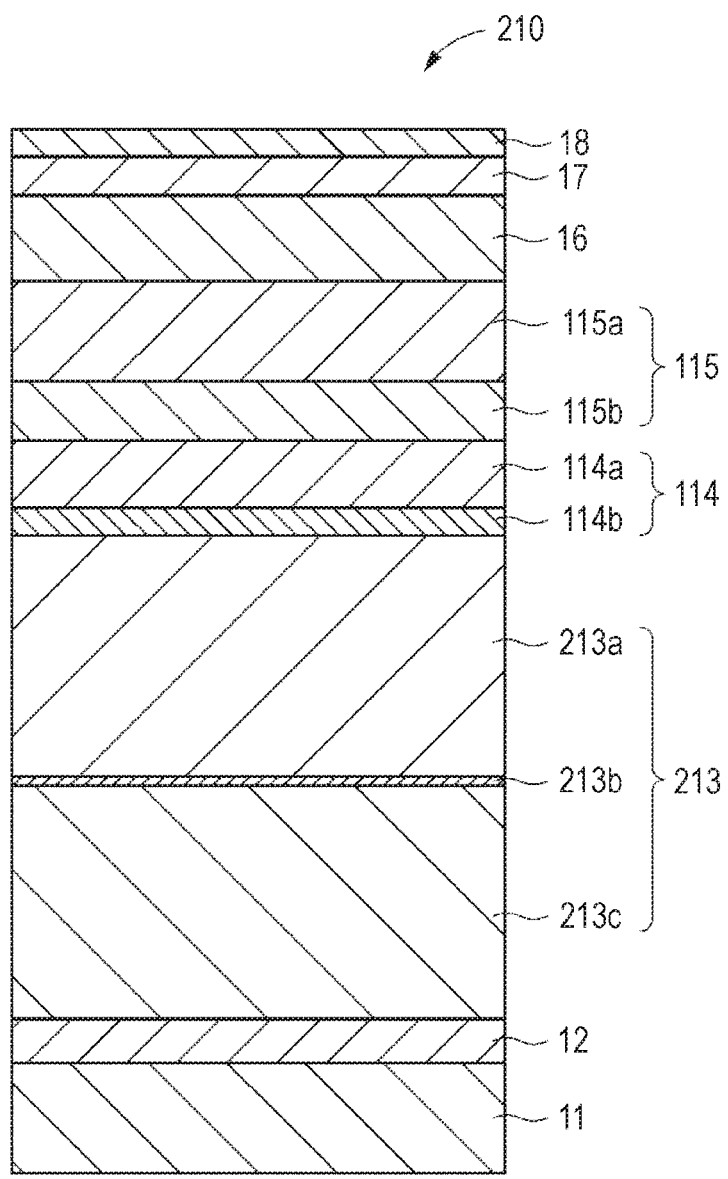
FIG. 6 is a cross-sectional view illustrating an exemplary configuration of a magnetic recording medium according to a third embodiment of the present technology.

As illustrated in FIG. 6, a magnetic recording medium 210 according to the third embodiment of the present technology differs from a magnetic recording medium 110 according to a second embodiment in that an APC-SUL 213 is provided. Note that a portion similar to a portion of the second embodiment will be denoted by a same reference sign in the third embodiment, and repetition of the same description will be omitted.

The APC-SUL 213 has a structure in which two soft magnetic layers 213a, 213c are stacked via a thin intermediate layer 213b, and magnetization is strongly coupled in antiparallel by utilizing exchange coupling via the intermediate layer 213b. Preferably, the soft magnetic layers 213a, 213c have a film thickness substantially same. A total film thickness of the soft magnetic layers 213a, 213c is preferably 40 nm or more, more preferably 40 nm or more and 70 nm or less. In the case of 40 nm or more, more excellent recording and reproducing characteristics can be obtained. On the other hand, in the case of 70 nm or less, productivity degradation caused by a film formation time for the APC-SUL 213 can be suppressed. It is preferable that materials of the soft magnetic layers 213a, 213c be the same material, and a material similar to that of a SUL 13 in the first embodiment can be used as the material thereof. The intermediate layer 213b has a film thickness of, for example, 0.8 nm or more and 1.4 nm or less, preferably 0.9 nm or more and 1.3 nm or less, and more preferably about 1.1 nm. Since the film thickness of the intermediate layer 213b is selected within a range of 0.9 nm or more and 1.3 nm or less, antiparallel exchange coupling between the upper and lower soft magnetic layers 213a, 213c becomes sufficient, and more excellent recording and reproducing characteristics can be achieved. Examples of the materials of the intermediate layer 213b may include one or more kinds of elements selected from a group formed of V, Cr, Mo, Cu, Ru, Rh, Re, and the like, and particularly a material including the Ru is preferable.

A squareness ratio Sq1 in a machine direction (MD) D1 of the magnetic recording medium 10 is a squareness ratio Sq2 equal to or less than the same in a transverse direction (TD) of the magnetic recording medium 10 (Sq1<Sq2 or Sq1≤Sq2). Additionally, both of squareness ratios in a machine direction (MD) and in a transverse direction (TD) of the magnetic recording medium 210 is 30% or less, preferably 20% or less, more preferably 10% or less, and furthermore preferably 5% or less. Consequently, more excellent recording and reproducing characteristics can be achieved.

In the APC-SUL 213, since residual magnetization in a direction of a magnetization facilitating axis A2 is canceled by antiparallel exchange coupling between the upper and lower soft magnetic layers 213a, 213c, residual magnetization tends to be nearly zero. Therefore, in the APC-SUL 213, the squareness ratio Sq1 in the machine direction (MD) D1 tends to be equal or substantially equal to the squareness ratio Sq2 in the transverse direction (TD) D2.

3.3 Effects

Since the APC-SUL 213 is used in the magnetic recording medium 210 according to the third embodiment, the soft magnetic layer 213a that is the upper layer portion is exchange-coupled in antiparallel to the soft magnetic layer 213c that is the lower layer portion, and a total magnetization amount of the upper and lower layers becomes zero in a residual magnetization state. Consequently, it is possible to prevent generation of spike-like noise in the case where a magnetic domain inside the APC-SUL 213 is moved. Therefore, recording and reproducing characteristics can be further improved.

3.4 Modified Example

In the second embodiment, the exemplary configuration in which both the foundation layer 114 and intermediate layer 115 have the two-layer structures has been described, but the configurations of the foundation layer and intermediate layer are not limited to this example. For example, both the foundation layer and intermediate layer may have a single-layer structure, or one of the foundation layer and the intermediate layer may have the two-layer structure and the other one has the single-layer structure.

EXAMPLES

In the following, the present technology will be specifically described using Examples, but the present technology is not limited to these Examples.

Example 1

(Film Forming Process of TiCr Foundation Layer)
First, a film of a TiCr foundation layer having a thickness of 5 nm was formed on a long polymer film provided as a non-magnetic base substrate under the following film forming conditions.
Sputtering system: DC magnetron sputtering system
Target: $Ti_{50}Cr_{50}$ target
Ultimate vacuum level: $5\times10^{-5}$ Pa
Gas species: Ar
Gas pressure: 0.5 Pa
(Film Forming Process of SUL)
Next, a film of a CoZrNb layer having a thickness of 100 nm was formed on the TiCr foundation layer provided as the SUL having a single-layer structure under the following film forming conditions. At this point, magnetic force parallel to the transverse direction (TD) of the non-magnetic base substrate was applied between an anode and a cathode of a sputtering device.
Sputtering system: DC magnetron sputtering system
Target: CoZrNb target
Gas species: Ar
Gas Pressure: 0.1 Pa
Input power: 96 $mW/mm^2$
Magnetic flux density: 3 mT
(Film Forming Process of TiCr Foundation Layer)
Next, a film of a TiCr foundation layer having a thickness of 3 nm was formed on the CoZrNb layer under the following film forming conditions.
Sputtering system: DC magnetron sputtering system
Target: $Ti_{50}Cr_{50}$ target
Ultimate vacuum level: $5\times10^{-5}$ Pa
Gas species: Ar
Gas pressure: 0.5 Pa
(Film Forming Process of NiW Foundation Layer)
Next, a film of a NiW foundation layer having a thickness of 10 nm was formed on the TiCr foundation layer under the following film forming conditions.
Sputtering system: DC magnetron sputtering system
Target: NiW target
Ultimate vacuum level: $5\times10^{-5}$ Pa
Gas species: Ar
Gas pressure: 0.5 Pa
(Film Forming Process of First Ru Intermediate Layer)
Next, a film of a first Ru intermediate layer having a thickness of 10 nm was formed on the NiW foundation layer under the following film forming conditions.
Sputtering system: DC magnetron sputtering system
Target: Ru target
Gas species: Ar
Gas pressure: 0.5 Pa
(Film Forming Process of Second Ru Intermediate Layer)
Next, a film of a second Ru intermediate layer having a thickness of 20 nm was formed on the first Ru intermediate layer under the following film forming conditions.
Sputtering system: DC magnetron sputtering system
Target: Ru target
Gas species: Ar
Gas Pressure: 1.5 Pa
(Film Forming Process of Magnetic Recording Layer)
Next, a film of a (CoCrPt)—$(SiO_2)$ magnetic recording layer having a thickness of 14 nm was formed on the second Ru intermediate layer under the following film forming conditions.
Sputtering system: DC magnetron sputtering system
Target: $(Co_{70}Cr_{15}Pt_{10})_{90}$—$(SiO_2)_{10}$ target
Gas species: Ar
Gas Pressure: 1.5 Pa
(Film Forming Process of Protection Layer)
Next, a film of a protection layer having a thickness of 5 nm was formed on the (CoCrPt)—$(SiO_2)$ magnetic recording layer under the following film forming conditions.
Sputtering system: DC magnetron sputtering system
Target: Carbon target
Gas species: Ar
Gas Pressure: 1.0 Pa
(Film Forming Process of Top Coat Layer)
Next, a lubricant is applied onto the protection layer, and a film of a top coat layer was formed on the protection layer. Thus, an intended magnetic tape was obtained.

Example 2

A magnetic tape was obtained in a manner similar to Example 1 except that a magnetic density of magnetic force applied in the transverse direction (TD) of the long polymer film was changed to 4.5 mT in the film forming process of the SUL.

Examples 3, 4, 5

A magnetic tape was obtained in a manner similar to Example 1 except that a film of an APC-SUL was formed instead of the SUL having a single-layer structure. Specifically, the film of the APC-SUL was formed as described below.

(Film Forming Process of First Soft Magnetic Layer)

First, a film of a CoZrNb layer having a thickness of 50 nm was formed as a first soft magnetic layer on a TiCr foundation layer under the following film forming conditions. At this point, magnetic force parallel to the transverse direction (TD) of the long polymer film was applied between the anode and cathode of the sputtering device.

Sputtering system: DC magnetron sputtering system
Target: CoZrNb target
Gas species: Ar
Gas Pressure: 0.1 Pa
Magnetic flux density: 4.5 mT (Film Forming Process of Ru Intermediate Layer)

Next, a film of a Ru intermediate layer having a thickness of 0.3 nm, 1.0 nm, or 1.5 nm was formed on the CoZrNb layer under the following film forming conditions.

Sputtering system: DC magnetron sputtering system
Target: Ru target
Gas species: Ar
Gas pressure: 0.3 Pa (Second Soft Magnetic Layer)

Next, a film of a CoZrNb layer having a thickness of 50 nm was formed as a second soft magnetic layer on the Ru intermediate layer under the following film forming conditions. At this point, magnetic force parallel to the transverse direction (TD) of the long polymer film was applied between the anode and cathode of the sputtering device.

Sputtering system: DC magnetron sputtering system
Target: CoZrNb target
Gas species: Ar
Gas Pressure: 0.1 Pa
Magnetic flux density: 4.5 mT Example 6

A film of a foundation layer having a single-layer structure formed of only a TiCr foundation layer was formed instead of a foundation layer having a two-layer structure formed of a TiCr foundation layer and a NiW foundation layer. Additionally, a film of an intermediate layer having a single-layer structure formed of only a second Ru intermediate layer was formed instead of an intermediate layer having a two-layer structure formed of a first Ru intermediate layer and a second Ru intermediate layer. A magnetic tape was obtained in a manner similar to Example 5 except for the above points.

Examples 7, 8

A magnetic tape was obtained in a manner similar to Example 1 except that a CoZrNb layer formed as an SUL has a film thickness of 50 nm or 33 nm.

Comparative Example 1

A magnetic tape was formed in a manner similar to Example 1 except for that input power is set to 40 mW/mm$^2$ and additionally a magnetic density of magnetic force parallel to the TD direction of the non-magnetic base substrate was set to 2 mT in a film forming process of an SUL.

Comparative Example 2

A magnetic tape was formed in a manner similar to Example 1 except for that input power was set to 55 mW/mm$^2$ and additionally a magnetic density of magnetic force parallel to the TD direction of the non-magnetic base substrate was set to 2 mT in a film forming process of an SUL.

Comparative Example 3

A magnetic tape was formed in a manner similar to Example 1 except for that a magnetic density of magnetic force parallel to the TD direction of the non-magnetic base substrate was set to 2 mT in a film forming process of an SUL.

Comparative Example 4

A magnetic tape is obtained in a manner similar to Example 1 except that a direction of magnetic of magnetic force was changed from the transverse direction (TD) to the machine direction (MD) of the long polymer film in the film forming process of the SUL.

(Characteristic Evaluation)

Following evaluation was conducted for the magnetic tapes obtained in Examples 1 to 8 and Comparative Examples 1 to 4 in the above-described manners.

(Magnetic Characteristic)

Squareness ratios in the TD direction and the MD direction of a magnetic tape were measured with a VSM by applying a magnetic field of 10 kOe or more. FIGS. 7A to 7C illustrate hysteresis loops of the magnetic tapes in Examples 3 to 6, Comparative Example 1 to 3, Examples 1, 2, 7, 8, and Comparative Example 4.

In the magnetic tape including the SUL and the recording layer, a fact that the squareness ratios of the magnetic tapes are almost same as a squareness ratio Sq of a single SUL will be described as follows. Here, the description will be provided exemplifying the magnetic tape in Example 2. A sample has a round shape having a size of a diameter 6.35 mm. MsV(SUL) that is a product of saturation magnetization Ms of the single SUL and a sample volume V, and MrV(SUL) that is a product of residual saturation magnetization Mr and the sample volume V are MsV(SUL) 2.71 memu and MrV(SUL) 0.27 memu respectively in the magnetization hard axis direction. Therefore, a squareness ratio thereof results in: Sq(SUL)=MrV(SUL)/MsV(SUL)=0.1 (10%).

Additionally, Ms(Rec.) and MrV(Rec.) of the single recording layer are respectively MsV(Rec.) 0.2 memu and Mr(Rec.) 0.01 memu. In the case of measurement is conducted in a state of having both the SUL and recording layer, the saturation magnetization MsV(Tot.) and saturation magnetization MrV(Tot.) are MsV(Tot.) 2.73 memu and MrV (Tot.) 0.28 emu respectively. Therefore, a squareness ratio Sq(Tot.) thereof is 0.102 (approx. 10%) and the squareness ratio of the magnetic tape is substantially same as the squareness ratio Sq(SUL) in the case of the single SUL.

(Recording and Reproducing Characteristics)

The recording and reproducing characteristics were evaluated as described below. First, measurement was performed by a so-called drag tester in which recording and reproducing are performed by using a single pole type recording head and a reproducing head of tunnel magnetoresistive (TMR) type, and reciprocally vibrating these heads by a piezo stage. In a recording region having a high recording density exceeding 100 Gb/in$^2$, sufficient recording and reproducing characteristics are hardly achieved even in a perpendicular magnetic recording medium mainly due to a recording problem, and combination of a single pole type (SPT) head capable of generating a steep magnetic field in a perpendicular direction with a two-layer perpendicular recording medium including an SUL is needed. Additionally, it seems also necessary to use the reproducing head of the tunnel magnetoresistive (TMR) type having a larger magnetoresistive change rate and higher reproduction sensitivity than a giant magnetoresistive head does. Due to such reasons, evaluation using the SPT recording head and TMR reproducing head were conducted here. Note that a read track width of the reproducing head was set to 75 nm here. Next, a recording wavelength was set to 300 kilo flux changes per inch (kFCI), and an SNR was acquired by calculating a ratio between peak-to-peak voltage of a reproducing wavelength and voltage acquired from a value obtained by integrating a noise spectrum in a bandwidth of 0 kFCI to 600 kFCI. Next, the acquired SNR was evaluated in three grades on the basis of following criteria, and results thereof are shown in Table 3. Note that signs "X", "○", and "⊙" in Table 3 correspond to the following criteria.

X: SNR is less than 16 dB
○: SNR is 16 dB or more and less than 19 dB
●: SNB is 19 dB or more Generally, it is said that a minimum SNR needed to implement a recording and reproducing system is about 16 dB in a SNR (so-called digital SNR) after processing such as wavelength equalization and error correction. Furthermore, in the case of considering output decrease caused by sliding between a magnetic tape and a magnetic head and degradation of practical characteristic such as deformation of the magnetic tape, it is desirable that a SNR margin be additionally set. Considering the margin, it seems preferable that the SNR be set to 19 dB or more.

Meanwhile, in the magnetic tapes of the present Examples, assuming that a linear recording density is 600 bit per inch (kBPI) and a track density is 169 tracks per inch (kTPI) while setting a track pit to twice a track width of the reproducing head, a surface recording density of 600 kBPI× 169 kTPI=101 Gb/in$^2$ can be achieved.

Table 1 shows compositions of the magnetic recording layers, intermediate layers, and foundation layers of the magnetic tapes in Examples 1 to 8 and Comparative Examples 1 to 4.

TABLE 1

| | MAGNETIC RECORDING LAYER | | | INTERMEDIATE LAYER | | | |
| --- | --- | --- | --- | --- | --- | --- | --- |
| | | | | | SECOND | | |
| | STRUCTURE | MATERIAL | FILM THICKNESS (nm) | STRUCTURE | SECOND LAYER MATERIAL | SECOND LAYER FILM THICKNESS (nm) | FIRST LAYER MATERIAL |
| EXAMPLE 1 | SINGLE-LAYER | CoPtCr—SiO$_2$ | 14 | TWO-LAYER | Ru | 20 | Ru |
| EXAMPLE 2 | SINGLE-LAYER | CoPtCr—SiO$_2$ | 14 | TWO-LAYER | Ru | 20 | Ru |
| EXAMPLE 3 | SINGLE-LAYER | CoPtCr—SiO$_2$ | 14 | TWO-LAYER | Ru | 20 | Ru |
| EXAMPLE 4 | SINGLE-LAYER | CoPtCr—SiO$_2$ | 14 | TWO-LAYER | Ru | 20 | Ru |
| EXAMPLE 5 | SINGLE-LAYER | CoPtCr—SiO$_2$ | 14 | TWO-LAYER | Ru | 20 | Ru |
| EXAMPLE 6 | SINGLE-LAYER | CoPtCr—SiO$_2$ | 14 | SINGLE-LAYER | Ru | 20 | — |
| EXAMPLE 7 | SINGLE-LAYER | CoPtCr—SiO$_2$ | 14 | TWO-LAYER | Ru | 20 | Ru |
| EXAMPLE 8 | SINGLE-LAYER | CoPtCr—SiO$_2$ | 14 | TWO-LAYER | Ru | 20 | Ru |
| COMPARATIVE EXAMPLE 1 | SINGLE-LAYER | CoPtCr—SiO$_2$ | 14 | TWO-LAYER | Ru | 20 | Ru |
| COMPARATIVE EXAMPLE 2 | SINGLE-LAYER | CoPtCr—SiO$_2$ | 14 | TWO-LAYER | Ru | 20 | Ru |
| COMPARATIVE EXAMPLE 3 | SINGLE-LAYER | CoPtCr—SiO$_2$ | 14 | TWO-LAYER | Ru | 20 | Ru |
| COMPARATIVE EXAMPLE 4 | SINGLE-LAYER | CoPtCr—SiO$_2$ | 14 | TWO-LAYER | Ru | 20 | Ru |

| | INTERMEDIATE LAYER | FOUNDATION LAYER | | | | |
| --- | --- | --- | --- | --- | --- | --- |
| | FIRST LAYER FILM THICKNESS (nm) | STRUCTURE | SECOND LAYER MATERIAL | SECOND LAYER FILM THICKNESS (nm) | FIRST LAYER MATERIAL | FIRST LAYER FILM THICKNESS (nm) |
| EXAMPLE 1 | 10 | TWO-LAYER | NiW | 10 | TiCr | 3 |
| EXAMPLE 2 | 10 | TWO-LAYER | NiW | 10 | TiCr | 3 |
| EXAMPLE 3 | 10 | TWO-LAYER | NiW | 10 | TiCr | 3 |
| EXAMPLE 4 | 10 | TWO-LAYER | NiW | 10 | TiCr | 3 |
| EXAMPLE 5 | 10 | TWO-LAYER | NiW | 10 | TiCr | 3 |
| EXAMPLE 6 | — | SINGLE-LAYER | — | — | TiCr | 3 |
| EXAMPLE 7 | 10 | TWO-LAYER | NiW | 10 | TiCr | 3 |
| EXAMPLE 8 | 10 | TWO-LAYER | NiW | 10 | TiCr | 3 |
| COMPARATIVE EXAMPLE 1 | 10 | TWO-LAYER | NiW | 10 | TiCr | 3 |
| COMPARATIVE EXAMPLE 2 | 10 | TWO-LAYER | NiW | 10 | TiCr | 3 |
| COMPARATIVE EXAMPLE 3 | 10 | TWO-LAYER | NiW | 10 | TiCr | 3 |
| COMPARATIVE EXAMPLE 4 | 10 | TWO-LAYER | NiW | 10 | TiCr | 3 |

Table 2 shows compositions of the SUL layers of magnetic tapes in Examples 1 to 8 and Comparative Examples 1 to 4.

TABLE 2

| | | SUL | | | | | SUL FILM FORMING CONDITIONS | | |
|---|---|---|---|---|---|---|---|---|---|
| | | UPPER LAYER/ LOWER LAYER MATERIAL | UPPER LAYER FILM THICK- NESS (nm) | LOWER LAYER FILM THICK- NESS (nm) | INTER- MEDIATE LAYER MATERIAL | INTER- MEDIATE LAYER FILM THICK- NESS (nm) | INPUT POWER (mW/mm²) | MAGNETIC FORCE DIREC- TION | MAGNETIC FORCE $B_s$ (mT) |
| | LAYER STRUCTURE | | | | | | | | |
| EXAMPLE 1 | SINGLE-LAYER | CoZrNb | 100 | — | — | — | 96 | TD | 3 |
| EXAMPLE 2 | SINGLE-LAYER | CoZrNb | 100 | — | — | — | 96 | TD | 4.5 |
| EXAMPLE 3 | THREE-LAYER | CoZrNb | 50 | 50 | Ru | 0.3 | 96 | TD | 4.5 |
| EXAMPLE 4 | THREE-LAYER | CoZrNb | 50 | 50 | Ru | 1.5 | 96 | TD | 4.5 |
| EXAMPLE 5 | THREE-LAYER | CoZrNb | 50 | 50 | Ru | 1.0 | 96 | TD | 4.5 |
| EXAMPLE 6 | THREE-LAYER | CoZrNb | 50 | 50 | Ru | 1.0 | 96 | TD | 4.5 |
| EXAMPLE 7 | SINGLE-LAYER | CoZrNb | 50 | — | — | — | 96 | TD | 3 |
| EXAMPLE 8 | SINGLE-LAYER | CoZrNb | 33 | — | — | — | 96 | TD | 3 |
| COMPARATIVE EXAMPLE 1 | SINGLE-LAYER | CoZrNb | 100 | — | — | — | 40 | TD | 2 |
| COMPARATIVE EXAMPLE 2 | SINGLE-LAYER | CoZrNb | 100 | — | — | — | 55 | TD | 2 |
| COMPARATIVE EXAMPLE 3 | SINGLE-LAYER | CoZrNb | 100 | — | — | — | 96 | TD | 2 |
| COMPARATIVE EXAMPLE 4 | SINGLE-LAYER | CoZrNb | 100 | — | — | — | 96 | MD | 3 |

Table 3 shows evaluation results of magnetic characteristic and recording and reproducing characteristics of the magnetic tapes in Examples 1 to 8 and Comparative Examples 1 to 4.

TABLE 3

| | MAGNETIC CHARACTERISTIC IN-PLANE DIRECTION | | RECORDING AND REPRODUCING CHARACTERISTICS | |
|---|---|---|---|---|
| | SQUARENESS RATIO (%) | | SNR | |
| | MD | TD | (dB) | EVALUATION |
| EXAMPLE 1 | 30 | 75 | 16 | ○ |
| EXAMPLE 2 | 10 | 90 | 18 | ○ |
| EXAMPLE 3 | 10 | 10 | 19 | ⊙ |
| EXAMPLE 4 | 5 | 5 | 20 | ⊙ |
| EXAMPLE 5 | 2 | 2 | 21 | ⊙ |
| EXAMPLE 6 | 30 | 30 | 16 | ○ |
| EXAMPLE 7 | 20 | 92 | 17 | ○ |
| EXAMPLE 8 | 30 | 95 | 16 | ○ |
| COMPARATIVE EXAMPLE 1 | 55 | 60 | 13 | X |
| COMPARATIVE EXAMPLE 2 | 50 | 65 | 14 | X |
| COMPARATIVE EXAMPLE 3 | 40 | 70 | 15 | X |
| COMPARATIVE EXAMPLE 4 | 75 | 30 | 14 | X |

Following points can be grasped from the above evaluation results.

When the squareness ratio in the machine direction is set to 30% or less, the SNR can be 16% or more. When both of the squareness ratios in the machine direction and transverse direction are set to 10% or less, and the SNR can be 19% or more. In order to set both of the squareness ratios in the machine direction and transverse direction to 10% or less, it is preferable that the SUL be the APC-SUL and the intermediate layer and the foundation layer each have the two-layer structure.

While the embodiments, modified examples thereof, and Examples of the present technology have been specifically described, the present technology is not limited to the above-described embodiments, modified examples, and Examples, and various kinds of modification based on the technical idea of the present technology can be made.

For example, the configurations, methods, processes, shapes, materials, numerical values, and the like described in the above-described embodiments, modified examples, and Examples are merely examples, and a configuration, a method, a process, a shape, a material and a numerical value different from these may be used as needed.

Also, the configurations, methods, processes, shapes, materials, numerical values, and the like in the above-described embodiments, modified examples, and Examples can be combined with each other without departing from the gist of the present technology.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

Additionally, the present technology can adopt configurations below.

(1)

A magnetic recording medium including a long-shaped base substrate having flexibility, a soft magnetic layer, and a magnetic recording layer, wherein a squareness ratio in a longitudinal direction of the base substrate is equal to or less than a squareness ratio in a short-side direction of the base substrate, and the squareness ratio in the longitudinal direction of the base substrate is 30% or less.

(2)

The magnetic recording medium recited in (1), wherein both of the squareness ratios in the longitudinal direction and the short-side direction of the base substrate are 10% or less.

(3)

The magnetic recording medium recited in (2), wherein both of the squareness ratios in the longitudinal direction and the short-side direction of the base substrate are 5% or less.

(4)

The magnetic recording medium recited in any one of (1) to (3), wherein a direction of a magnetization easy axis of the soft magnetic layer is the longitudinal direction of the base substrate.

(5)

The magnetic recording medium recited in any one of (1) to (3), wherein the soft magnetic layer includes a first soft magnetic layer, an intermediate layer, and a second soft magnetic layer.

(6)

The magnetic recording medium recited in (5), wherein a direction of a magnetization easy axis in both of the first soft magnetic layer and the second soft magnetic layer is the longitudinal direction of the base substrate.

(7)

The magnetic recording medium recited in any one of (1) to (6), further including at least one of a foundation layer and an intermediate layer provided between the soft magnetic layer and the magnetic recording layer.

(8)

The magnetic recording medium recited in (7), wherein the foundation layer includes Ti and Cr.

(9)

The magnetic recording medium recited in (7), wherein the foundation layer includes a first foundation layer and a second foundation layer.

(10)

The magnetic recording medium recited in (9), wherein the first foundation layer is provided on the soft magnetic layer side and includes Ti and Cr, and the second foundation layer is provided on the intermediate layer side and includes Ni and W.

(11)

The magnetic recording medium recited in any one of (7) to (10), wherein the intermediate layer includes Ru.

(12)

The magnetic recording medium recited in any one of (7) to (10), wherein the intermediate layer includes a first intermediate layer and a second intermediate layer.

(13)

The magnetic recording medium recited in (12), wherein the first intermediate layer and the second intermediate layer include Ru.

(14)

The magnetic recording medium recited in any one of (1) to (13), wherein the recording layer has a granular structure in which a particle including Co, Pt, and Cr is separated by an oxide.

(15)

The magnetic recording medium recited in any one of (1) to (14), further including a foundation layer provided between the base substrate and the soft magnetic layer, wherein the foundation layer has an amorphous state and includes Ti and Cr.

(16)

The magnetic recording medium recited in any one of (1) to (15), wherein the base substrate is a film.

(17)

The magnetic recording medium recited in any one of (1) to (16), further including a lubrication layer that includes at least one kind of a carboxylic compound represented by General Formula (1) below.

General Formula (1):

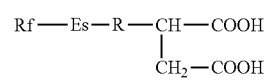

[Chemical Formula 1]

(In this formula, Rf is a non-substituted or substituted and also saturated or unsaturated fluorine-containing hydrocarbon group or hydrocarbon group, Es is an ester bond, and R may be omitted but is a non-substituted or substituted and also saturated or unsaturated hydrocarbon group.)

(18)

The magnetic recording medium recited in any one of (1) to (16), further including a lubrication layer that includes one or both of carboxylic compounds represented by General Formulas (2) and (3) below.

General Formula (2):

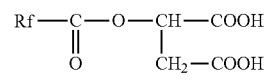

[Chemical Formula 2]

(In this formula, Rf is a non-substituted or substituted and also saturated or unsaturated fluorine-containing hydrocarbon group or hydrocarbon group.)

General Formula (3):

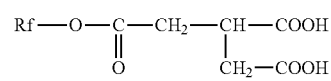

[Chemical Formula 3]

(In this formula, Rf is a non-substituted or substituted and also saturated or unsaturated fluorine-containing hydrocarbon group or hydrocarbon group.)

(19) The magnetic recording medium recited in (17) or (18), wherein Rf has the total carbon number of 6 to 50, also has the total carbon number of fluorohydrocarbon group of 4 to 20, and is saturated or unsaturated fluorine-containing hydrocarbon.

REFERENCE SIGNS LIST

10 Magnetic recording medium
11 Base substrate
12, 14 Foundation layer
14a First foundation layer
14b Second foundation layer
13 Soft magnetic underlayer
15 Intermediate layer
15a First intermediate layer
15b Second intermediate layer
16 Magnetic recording layer
17 Protection layer

The invention claimed is:

1. A magnetic recording medium comprising a long-shaped base substrate having flexibility, a soft magnetic layer, and a magnetic recording layer,
wherein a squareness ratio of the soft magnetic layer in a longitudinal direction of the base substrate is equal to or less than a squareness ratio of the soft magnetic layer in a short-side direction of the base substrate, and
wherein both of the squareness ratios in the longitudinal direction and the short-side direction of the base substrate are 5% or less.

2. The magnetic recording medium according to claim 1, wherein a direction of a magnetization easy axis of the soft magnetic layer is the longitudinal direction of the base substrate.

3. The magnetic recording medium according to claim 1, wherein the soft magnetic layer includes a first soft magnetic layer, an intermediate layer, and a second soft magnetic layer.

4. The magnetic recording medium according to claim 3, wherein a direction of a magnetization easy axis in both of the first soft magnetic layer and the second soft magnetic layer is the longitudinal direction of the base substrate.

5. The magnetic recording medium according to claim 1, further comprising at least one of a foundation layer and an intermediate layer provided between the soft magnetic layer and the magnetic recording layer.

6. The magnetic recording medium according to claim 5, wherein the foundation layer includes Ti and Cr.

7. The magnetic recording medium according to claim 5, wherein the foundation layer includes a first foundation layer and a second foundation layer.

8. The magnetic recording medium according to claim 7, wherein
the first foundation layer is provided on the soft magnetic layer side and includes Ti and Cr, and
the second foundation layer is provided on the intermediate layer side and includes Ni and W.

9. The magnetic recording medium according to claim 5, wherein the intermediate layer includes Ru.

10. The magnetic recording medium according to claim 5, wherein the intermediate layer includes a first intermediate layer and a second intermediate layer.

11. The magnetic recording medium according to claim 10, wherein the first intermediate layer and the second intermediate layer include Ru.

12. The magnetic recording medium according to claim 1, wherein the recording layer has a granular structure in which a grain including Co, Pt, and Cr is separated by an oxide.

13. The magnetic recording medium accordion to claim 1, further including a foundation layer provided between the base substrate and the soft magnetic layer,
wherein the foundation layer has an amorphous state and includes Ti and Cr.

14. The magnetic recording medium according to claim 1, wherein the base substrate is a film.

15. The magnetic recording medium according to claim 1, further comprising a lubrication layer including at least one kind of a carboxylic compound represented by General Formula (1) below;

General Formula (1):

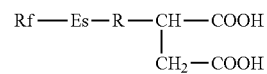

[Chemical Formula 1]

(In this formula, Rf is a non-substituted or substituted and also saturated or unsaturated fluorine-containing hydrocarbon group or hydrocarbon group, Es is an ester bond, and R may be omitted but is a non-substituted or substituted and also saturated or unsaturated hydrocarbon group).

16. The magnetic recording medium according to claim 1, further comprising a lubrication layer that includes one or both of carboxylic compounds represented by General Formulas (2) and (3) below;

General Formula (2):

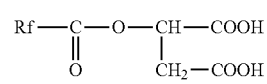

[Chemical Formula 2]

(In this formula, Rf is a non-substituted or substituted and also saturated or unsaturated fluorine-containing hydrocarbon group or hydrocarbon group)

General Formula (3):

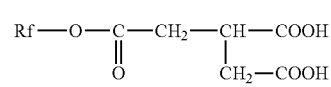

[Chemical Formula 3]

(In this formula, Rf is a non-substituted or substituted and also saturated or unsaturated fluorine-containing hydrocarbon group or hydrocarbon group).

17. The magnetic recording medium according to claim 16, wherein Rf has the total carbon number of 6 to 50, also has the total carbon number of fluorohydrocarbon group of 4 to 20, and is saturated or unsaturated fluorine-containing hydrocarbon.

18. A magnetic recording medium comprising a long-shaped base substrate having flexibility, a soft magnetic layer, and a magnetic recording layer,
wherein a squareness ratio of the soft magnetic layer in a longitudinal direction of the base substrate is equal to or less than a squareness ratio of the soft magnetic layer in a short-side direction of the base substrate, wherein the squareness ratio in the longitudinal direction of the base substrate is 30% or less, and a foundation layer and an intermediate layer provided between the soft magnetic layer and the magnetic recording layer, wherein the foundation layer includes a first foundation layer and a second foundation layer, wherein the first foundation layer is provided on the soft magnetic layer side and includes Ti and Cr, and wherein the second foundation layer is provided on the intermediate layer side and includes Ni and W.

19. The magnetic recording medium according to claim 18, wherein both of the squareness ratios in the longitudinal direction and the short-side direction of the base substrate are 10% or less.

20. The magnetic recording medium according to claim 18, wherein both of the squareness ratios in the longitudinal direction and the short-side direction of the base substrate are 5% or less.

* * * * *